US011403812B2

(12) United States Patent
Hu et al.

(10) Patent No.: US 11,403,812 B2
(45) Date of Patent: Aug. 2, 2022

(54) 3D OBJECT RECONSTRUCTION METHOD, COMPUTER APPARATUS AND STORAGE MEDIUM

(71) Applicant: SHENZHEN UNIVERSITY, Guangdong (CN)

(72) Inventors: Ruizhen Hu, Guangdong (CN); Hui Huang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 16/491,544

(22) PCT Filed: Nov. 9, 2018

(86) PCT No.: PCT/CN2018/114808
§ 371 (c)(1),
(2) Date: Sep. 5, 2019

(87) PCT Pub. No.: WO2020/087564
PCT Pub. Date: May 7, 2020

(65) Prior Publication Data
US 2021/0327126 A1    Oct. 21, 2021

(30) Foreign Application Priority Data

Oct. 31, 2018 (CN) .......................... 201811288537.7

(51) Int. Cl.
*G06T 17/00* (2006.01)
*G06K 9/62* (2022.01)
*G06V 20/64* (2022.01)

(52) U.S. Cl.
CPC ............ *G06T 17/00* (2013.01); *G06K 9/6265* (2013.01); *G06V 20/64* (2022.01)

(58) Field of Classification Search
CPC . G06T 17/00; G06T 2207/20084; G06T 7/50; G06K 9/00201; G06K 9/6265; G06K 9/6274; G06V 20/64; G06V 10/82
See application file for complete search history.

(56) References Cited

U.S. PATENT DOCUMENTS 10,186,038 B1 * 1/2019 Kluckner ................. G06T 7/11
2017/0337693 A1 * 11/2017 Baruch ................... G06T 7/162
(Continued)

FOREIGN PATENT DOCUMENTS

| CN | 107358648 A | 11/2017 |
|---|---|---|
| CN | 107945269 A | 4/2018 |

(Continued)

OTHER PUBLICATIONS

Dai, Angela, et al. "Scannet: Richly-annotated 3d reconstructions of indoor scenes." Proceedings of the IEEE conference on computer vision and pattern recognition. 2017 (Year: 2017).*

(Continued)

*Primary Examiner* — Maurice L. McDowell, Jr.
(74) *Attorney, Agent, or Firm* — Brandon V. Zuniga; James R. Gourley; Carstens & Cahoon, LLP (57) ABSTRACT

A three-dimensional (3D) object reconstruction method a computer apparatus and a storage medium. A terminal acquires a scanning image sequence of a target object with the scanning image sequence including at least one frame of at least one scanning image including depth information, uses a neural network algorithm to acquire a predicted semantic label of each scanning image based on the at least one scanning image in the scanning image sequence, and then reconstructs a 3D model of the target object according to the at least one predicted semantic labels and the at least one scanning image in the scanning image sequence. In one aspect, the reconstructing comprises: mapping, according to label distribution corresponding to each voxel of a 3D preset (Continued)

model and each label of the at least one predicted semantic label, each scanning image to a corresponding position of the 3D preset model, to obtain the 3D model.

11 Claims, 6 Drawing Sheets

(56) References Cited

U.S. PATENT DOCUMENTS

| | | | | |
|---|---|---|---|---|
| 2018/0322623 | A1* | 11/2018 | Memo | G06N 3/084 |
| 2019/0043203 | A1* | 2/2019 | Fleishman | G06T 17/00 |
| 2019/0108396 | A1* | 4/2019 | Dal Mutto | G06K 9/6267 |
| 2019/0138786 | A1* | 5/2019 | Trenholm | G06T 7/50 |
| 2021/0082184 | A1* | 3/2021 | Claessen | G06T 7/11 |

FOREIGN PATENT DOCUMENTS

| | | |
|---|---|---|
| CN | 108090960 A | 5/2018 |
| CN | 108510573 A | 9/2018 |

OTHER PUBLICATIONS

Curless et al., "A Volumetric Method for Building Complex Models from Range Images." In Proceedings of the 23rd annual conference on Computer graphics and interactive techniques, pp. 303-312. ACM, 1996. (Year: 1996).*

Dai, Angela, et al. "Scancomplete: Large-scale scene completion and semantic segmentation for 3d scans." Proceedings of the IEEE Conference on Computer Vision and Pattern Recognition. 2018. (Year: 2018).*

Qi, "PointNet++: Deep Hierarchical Feature Learning on Point Sets in a Metric Space", 31st Conference on Neural Information Processing Systems (NIPS 2017), Long Beach, CA, USA (Year: 2017).*

International Search Report for Application No. PCT/CN2018/114808 dated Jul. 25, 2019 (9 pages).

Sanjayan, Jay G., et al., "Effect of surface moisture on inter-layer strength of 3D printed concrete," Construction and Building Materials, 172 (2018) 468-475, Mar. 23, 2018 (8 pages).

* cited by examiner

FIG. 1

```
┌─────────────────────────────────────────────────┐
│ A scanning image sequence of a target object is │
│ acquired, the scanning image sequence includes  │──── S101
│ at least one frame of scanning image, and the   │
│ scanning images include depth information.      │
└─────────────────────────────────────────────────┘
                        │
                        ▼
┌─────────────────────────────────────────────────┐
│ Scanning images in the scanning image sequence  │
│ are predicted by adopting a neural network      │──── S102
│ algorithm, and a predicted semantic label of    │
│ each scanning image is acquired.                │
└─────────────────────────────────────────────────┘
                        │
                        ▼
┌─────────────────────────────────────────────────┐
│ A 3D model of the target object is reconstructed│
│ according to the predicted semantic labels and  │──── S103
│ the scanning images in the scanning image       │
│ sequence.                                       │
└─────────────────────────────────────────────────┘
```

3D OBJECT RECONSTRUCTION METHOD, COMPUTER APPARATUS AND STORAGE MEDIUM

CROSS REFERENCES TO RELATED APPLICATION

This application is a US 371 application from PCT/CN2018/114808 filed Nov. 9, 2018, which claims priority to Chinese Patent Application No. 201811288537.7 filed Oct. 31, 2018, entitled "3D OBJECT RECONSTRUCTION METHOD, DEVICE, APPARATUS AND STORAGE MEDIUM" filed on Oct. 31, 2018, the contents of which is expressly incorporated herein by reference in its entirety.

TECHNICAL FIELD

The present disclosure relates to the technical field of neural networks, and in particular to a three-dimensional (3D) object reconstruction method, computer apparatus and a storage medium.

BACKGROUND

In recent years, the scanning technology has made great progress. However, the acquisition for 3D scenes is still a challenging work, especially in the field of creating large numbers of high-quality models.

In a common method for reconstructing 3D models, a hand-held scanning apparatus is used to continuously scan around an object without calibration to acquire scanning images of the object. The images are then registered by using depth or color information to reconstruct a 3D model of the object.

However, with the method above, the hand-held scanning apparatus is not accurately tracked in the process of acquiring the scanning images. In addition, the noise in the data can easily cause wrong registrations in the scanning result, which leads to the problem that the reconstruction for the 3D model of the object is not accurate.

SUMMARY

In view of the above, in order to solve the problem that the reconstruction for the 3D model of the object is not accurate, a 3D object reconstruction method, a device, an apparatus and a storage medium are provided.

In a first aspect, a 3D object reconstruction method is provided. The method includes:

acquiring a scanning image sequence of a target object, the scanning image sequence including at least one frame of scanning image, and the scanning images including depth information;

predicting scanning images in the scanning image sequence by adopting a neural network algorithm, and acquiring a predicted semantic label of each scanning image; and reconstructing a 3D model of the target object according to the predicted semantic labels and the scanning images in the scanning image sequence.

With the 3D object reconstruction method above, a terminal predicts the scanning images in the scanning image sequence by acquiring a scanning image sequence of a target object and adopting a neural network algorithm, acquires a predicted semantic label of each scanning image, and reconstructs a 3D model of the target object according to the predicted semantic labels and the scanning images in the scanning image sequence. In the present embodiment, the terminal acquires the predicted semantic labels of the scanning images by adopting a neural network algorithm, and reconstructs a 3D model of the target object according to the predicted semantic labels and the scanning images. In this way, the reconstructed 3D model can be more accurate, and the accuracy of the reconstructed 3D model can be improved.

In a second aspect, a computer apparatus including a memory and a processor is provided. The memory is stored with computer programs, and the steps below will be implemented when the processor executes the computer programs: acquiring a scanning image sequence of a target object, the scanning image sequence including at least one frame of scanning image, and the scanning images including depth information;

predicting, by adopting a neural network algorithm, scanning images in the scanning image sequence, and acquiring a predicted semantic label of each scanning image; and reconstructing, according to the predicted semantic labels and the scanning images in the scanning image sequence, a 3D model of the target object.

In a third aspect, a computer-readable storage medium storing with computer programs is provided. The steps below will be implemented when the processor executes the computer programs:

acquiring a scanning image sequence of a target object, the scanning image sequence including at least one frame of scanning image, and the scanning images including depth information;

predicting, by adopting a neural network algorithm, scanning images in the scanning image sequence, and acquiring a predicted semantic label of each scanning image; and reconstructing, according to the predicted semantic labels and the scanning images in the scanning image sequence, a 3D model of the target object.

With the 3D object reconstruction method, the device, the apparatus and the storage medium above, a terminal predicts the scanning images in the scanning image sequence by acquiring a scanning image sequence of a target object and adopting a neural network algorithm, acquires a predicted semantic label of each scanning image, and reconstructs a 3D model of the target object according to the predicted semantic labels and the scanning images in the scanning image sequence. In the present embodiment, the terminal acquires the predicted semantic labels of the scanning images by adopting a neural network algorithm, and reconstructs a 3D model of the target object according to the predicted semantic labels and the scanning images. In this way, the reconstructed 3D model can be more accurate, and the accuracy of the reconstructed 3D model can be improved.

DETAILED DESCRIPTION

Figure 1:
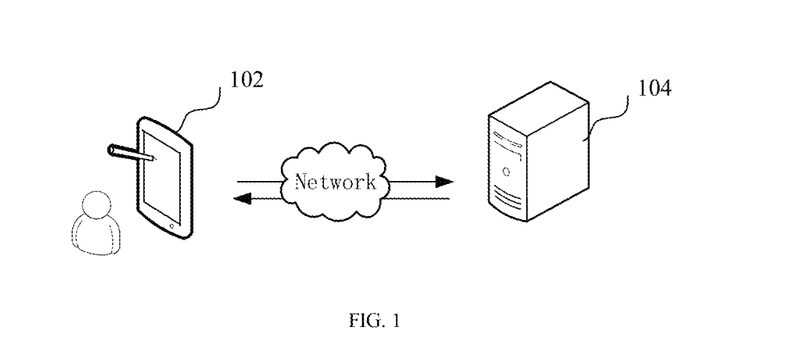
FIG. 1 is a schematic diagram of a 3D object reconstruction method provided by an embodiment.

The 3D object reconstruction method provided by the present disclosure may be applied to the application environment as shown in FIG. 1. A terminal 102 communicates with a server 104 via a network. The terminal 102 may be, but is not limited to, various personal computers, a notebook computer, a smart phone, a tablet computer, and a portable wearable device. The server 104 may be implemented by using a single server or a server cluster composed of multiple servers.

The 3D object reconstruction method provided by the present disclosure may be applied to the process of reconstructing various scenes. It may be applied to the process of reconstructing a scene in, for example, human-computer interaction, virtual reality, unmanned, route plan, or navigation and positioning. The embodiment of the present disclosure does not limit this.

The 3D object reconstruction method provided by the present embodiment may be applied to a terminal. The terminal may be an electronic apparatus, such as a smart phone, a tablet computer, a notebook computer, a desktop computer, or a personal digital assistant which is equipped with the function of data processing. The present embodiment does not limit the specific form of the terminal.

It should be noted that the 3D object reconstruction method provided by the embodiment of the present disclosure may be performed by a 3D object reconstruction device, which implements partial or all the terminal for reconstructing the 3D object by a software, a hardware, or a combination of hardwares and softwares.

In order to clarify the destination, the technical solutions and the merit of the embodiment of the present disclosure, the technical solutions in the embodiments of the present disclosure are clearly and completely described below in conjunction with drawings in the embodiments of the present disclosure. Obviously, the embodiments described are only some of the embodiments of the present disclosure, and not all the embodiments. All other embodiments obtained by a person of ordinary skill in the art based on the embodiments in the present disclosure without creative efforts are within the scope of the present disclosure.

Figure 2:
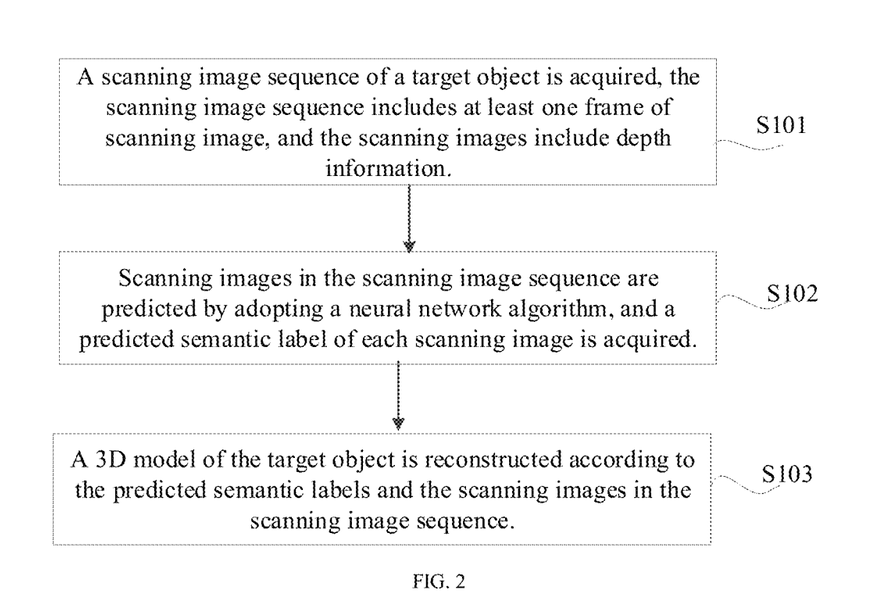
FIG. 2 is a schematic flow chart of a 3D object reconstruction method in an embodiment.

FIG. 2 is a schematic flow chart of a 3D object reconstruction method in an embodiment. The present embodiment relates to the specific process of acquiring a 3D image according to a part semantic label. The method includes the following steps as shown in FIG. 2.

At S101, a scanning image sequence of a target object is acquired, the scanning image sequence including at least one frame of scanning image, and the scanning images including depth information.

Specifically, depth information may be the distance from the camera to the object corresponding to each pixel. The scanning images typically contain depth information and color information, but may be stored in a different way. The embodiment of the present disclosure does not limit this. The scanning image sequence may be acquired by scanning the same object and sorting by scanning time. It may also be acquired by scanning the same object in different angles and sorting by angles. The embodiment of the present disclosure does not limit this. In the specific process of acquiring a scanning image sequence of the target object, it is possible to acquire the scanning image sequence using the scanning apparatus by continuously scanning the target object, or scanning the target object in multiple fixed angles. The embodiment of the present disclosure does not limit this.

At S102, scanning images in the scanning image sequence are predicted by adopting a neural network algorithm, and a predicted semantic label of each scanning image is acquired.

Specifically, a semantic label may be an annotation used to represent a physical meaning of the actual object in the scanning image. It may be an annotation of pointing out what object the image is, or it may also be an annotation of pointing out what part of an object that the image is. The embodiment of the present disclosure does not limit this. For example, a semantic label may be an object name such as "backrest", "armrest", or "leaf", etc. In the specific process of acquiring semantic labels corresponding to partial scanning images in the scanning image sequence, it is possible to manually add part semantic labels to partial scanning images. Alternatively, it is possible to acquire the semantic labels of the scanning images by learning the scanning images using the algorithm of machine learning and then acquiring the physical meaning of the scanning images. In addition, it is possible to acquire part semantic labels of partial scanning images by manually annotating a small number of scanning images in physical meaning, and to adopt the machine learning method to perform machine learning on the annotated scanning images and partial scanning images. The embodiment of the present disclosure does not limit this.

Furthermore, a predicted semantic label may refer to a prediction result of the scanning image, which can indicate an annotation of the object corresponding to the scanning image, or the probability of what specific object that the scanning image is. The embodiment of the present disclosure does not limit this. In the specific process of acquiring a predicted semantic label of each scanning image, it is possible to acquire a predicted semantic label of a scanning image by adopting a neural network algorithm and predicting scanning images in the scanning image sequence.

As an example, the architecture of VGG-16 is adopted to model the neural network algorithm. The neural network is trained using a back-propagation algorithm of random gradient descent. During training, the input to the network is a set of RGBD images and corresponding segmented images with part semantic labels. In the first iteration, the amount of training data is very small. The present embodiment performs training on the pretrained network with the formula below to find a set of network parameters $W_s$ which minimizes the loss of the object classification.

$$\text{Loss}(\{I_i\}, \{y_i\}, W_s) = -\frac{1}{N}\sum_i^N \log P(y_i \mid I_i, W_s)$$

"Loss" represents loss function, "N" represents the amount of images for training, and $P(y_i|I_i,W_s)$ represents the probability of image $I_i$ being labeled as a true object label $y_i$. After pre-training, the present embodiment acquires the network parameter $W_s$ for a fine tuning of RGBD images with annotations. The goal of fine tuning is to minimize the classification loss at the pixel level. The loss function is defined as following.

$$\text{Loss}(I, m, W_s) = -\frac{1}{N}\sum_i^N \frac{1}{|I_i|}\sum_{j=1}^{|I_i|} \log P(m_{ij} \mid I_i, P_{ij}, W_s)$$

$I_i$ represents an input image, $m_{ij}$ represents the true label of pixel $P_{ij}$ in the image of $I_i$, $|I_i|$ represents the amount of pixels in the image $I_i$ and $P(m_{ij}|I_i,P_{ij},W_s)$ represents the probability of the j-th pixel of the image $I_i$ being labeled as a true component label $m_{ij}$. The present embodiment acquires the predicted semantic labels by minimizing the sum of the pixel errors of all pixels in all training images.

At a test phase, giving a pixel "p" of an image I', the present disclosure uses the learned network parameter to calculate the label probability of the pixel as shown in the formula below, which is a representative form of the predicted semantic label.

$$P(m_k|P) = P(m_k|I',p,W_s), \text{ for all } k \in \{1, \ldots, K\}$$

"K" represents the possible amount of the labels, and $m_k$ represents the k-th label. With the step above, the present embodiment can acquire the predicted semantic label of each scanning image.

At S103, a 3D model of the target object is reconstructed according to the predicted semantic labels and the scanning images in the scanning image sequence.

Specifically, the reconstruction may be a 3D digitization processing representing the true object, which may reconstruct the 3D model of the target object according to the predicted semantic labels and the scanning images in the scanning image sequence. In the specific process of reconstructing the 3D model of the target object according to the predicted semantic labels and the scanning images in the scanning image sequence, it is possible to acquire the 3D image of the target object by mapping the scanning images in the scanning image sequence to the position predicted in the predicted semantic label according to the predicted semantic label. Alternatively, it is possible to reconstruct the 3D model of the target object by mapping the scanning images in the scanning sequence to the corresponding mesh of the 3D preset model, which is composed of multiple meshes, according to the predicted semantic label. The embodiment of the present disclosure does not limit this.

With the 3D object reconstruction method above, a terminal predicts the scanning images in the scanning image sequence by acquiring a scanning image sequence of a target object and adopting a neural network algorithm, and acquires a predicted semantic label of each scanning image. The terminal then reconstructs a 3D model of the target object according to the predicted semantic labels and the scanning images in the scanning image sequence. In the present embodiment, the terminal acquires the predicted semantic labels of the scanning images by adopting a neural network algorithm, and reconstructs a 3D model of the target object according to the predicted semantic labels and the scanning images. This makes the reconstructed 3D model more accurate, and the accuracy of the reconstructed 3D model is improved.

Further, based on the embodiment above, it is possible to reconstruct a projection label using the 3D object, and then updating the predicted semantic label by the confidence level between the projection label and the predicted semantic label, to acquire a more accurate 3D object reconstruction. The detail will be illustrated with reference to FIG. 3-6.

Figure 3:
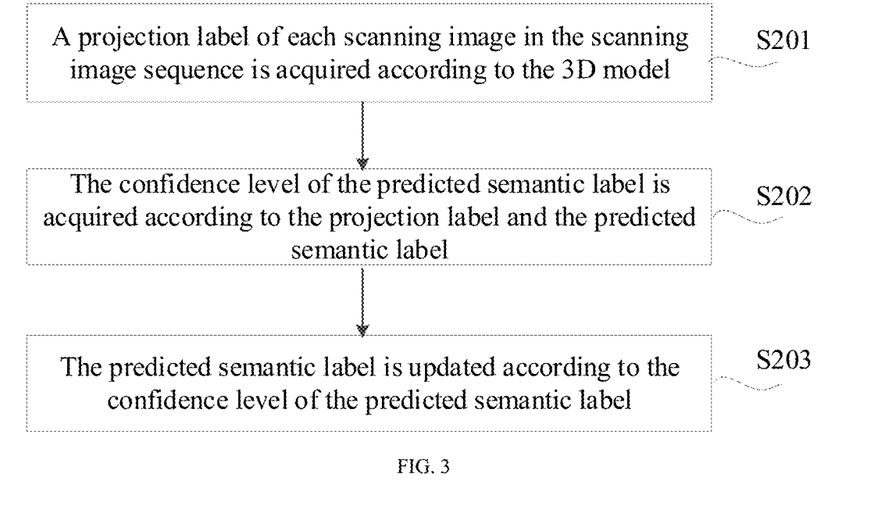
FIG. 3 is a schematic flow chart of a 3D object reconstruction method in another embodiment.

FIG. 3 is a schematic flow chart of a 3D object reconstruction method in another embodiment. The present embodiment relates to the specific process of updating the predicted semantic label according to the projection label. As shown in FIG. 3, the method includes the following steps.

At S201, a projection label of each scanning image in the scanning image sequence is acquired according to the 3D model.

Figure 3A:
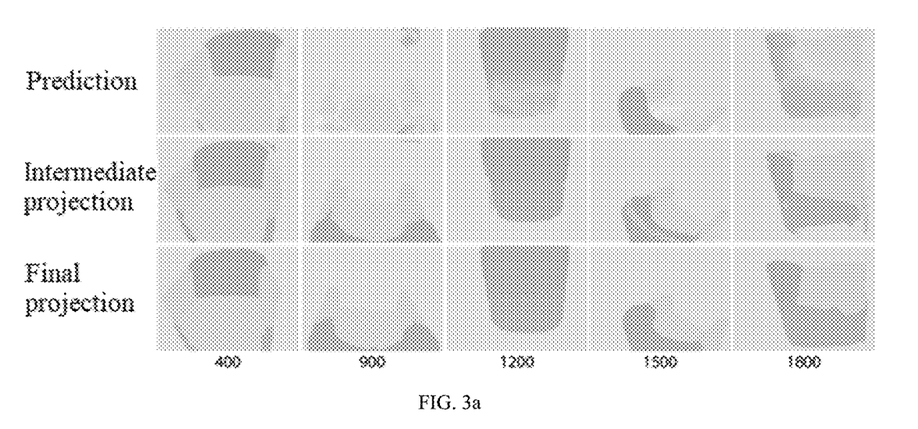
FIG. 3a is a schematic diagram of a 3D object reconstruction in an embodiment.

Specifically, the projection label may be the scanning image corresponding to the predicted semantic label in the acquired 3D model, an annotation of the image acquired by projecting the 3D image onto the image of the frame where the original image is located. In FIG. 3a, it shows the generated images by the projection of the 3D model acquired, which are annotated to be the projection labels.

In the specific process of acquiring the projection label, it is possible to label the component of the 3D image acquired and then projecting, and acquiring the labeled projection image, wherein the carried annotation is the projection label. Alternatively, it is possible to project the 3D image first and obtaining the projection image, and then annotating the projection image, to acquire the projection label. The embodiment of the present disclosure does not limit this.

At S202, the confidence level of the predicted semantic label is acquired according to the projection label and the predicted semantic label.

Specifically, a confidence level may represent the consistency between a predicted semantic label and a projection label. Since a projection label is acquired according to the projection of the 3D image acquired, it can annotate the target object more accurately. A confidence level of a predicted semantic label may be acquired by comparing the projection label and the predicted semantic label. A confidence level of a predicted semantic label may be the similarity between the images corresponding to the projection label and the predicted semantic label. It may also be the ratio of consistent pixels in the images corresponding to the projection label and the predicted semantic label. The embodiment of the present disclosure does not limit this.

At S203, the predicted semantic label is updated according to the confidence level of the predicted semantic label.

Specifically, based on the S202 above, after acquiring the confidence level of the predicted semantic label, it is possible to update the predicted semantic label according to the confidence level. Which is that, the predicted semantic labels are divided into predicted semantic labels of high-confidence-level and low-confidence-level according to the confidence level of the predicted semantic label. Self-learning is then performed on the scanning images corresponding to predicted semantic labels of high-confidence-level, to acquire more scanning images of the predicted semantic labels; the scanning images are re-annotated corresponding to predicted semantic labels of low-confidence-level, to acquire the updated predicted semantic labels. Since the scanning images in the scanning image sequence are continuous, the difference between the scanning images of adjacent frames is very small, alternatively, it is possible that a high-confidence-level sequence is acquired according to the confidence level of the predicted semantic labels, and the training set of the self-learning is expanded according to the high-confidence-level sequence, to update the predicted semantic labels, setting the sequence corresponding to the scanning images of high-confidence-level predicted semantic labels as high-confidence-level sequence, more predicted semantic labels are acquired by picking partial scanning images form the high-confidence-level sequence for expanding the training set of self-learning. The embodiment of the present disclosure does not limit this.

In the specific process of updating the predicted semantic labels, it is possible to acquire more predicted semantic labels by re-annotating the original predicted semantic labels. Alternatively, it is possible to acquire predicted semantic labels by adding or subtracting existing predicted semantic labels to acquire a new set of predicted semantic labels. The embodiment of the present disclosure does not limit this.

For example, a scanning image sequence A includes multiple scanning images, such as a1, a2, a3, a4 . . . an. The predicted semantic label of the scanning image a3 is a high-confidence-level predicted semantic label. Then the scanning image sequence A can be determined to be a high-confidence-level sequence because of this. In addition, a uniform sampling is performed on sequence A, that is extracting 1 frame every 25 frames as the training data of the self-learning. After self-learning, more predicted semantic labels are acquired, which are the updated predicted semantic labels.

With the 3D reconstruction method above, a terminal acquires a projection label of each scanning image in the scanning image sequence according to the 3D model, and then the confidence level of the predicted semantic label is acquired according to the projection label and the predicted semantic label. In addition, the terminal updates the predicted semantic label according to the confidence level of the predicted semantic label. In the present embodiment, the terminal acquires the confidence level of the predicted semantic label according to the projection label and the predicted semantic label, and updates the predicted semantic label according to the confidence level of the predicted semantic label. This makes the updated predicted semantic label and the 3D image acquired according to the predicted semantic labels and the scanning images more accurate. The accuracy of the 3D model of the constructed target object is further improved.

Figure 4:
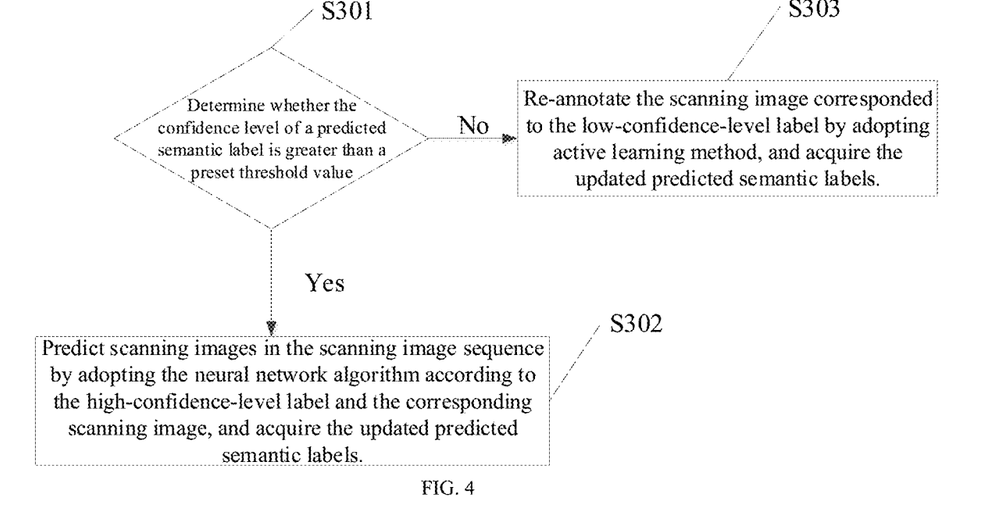
FIG. 4 is a schematic flow chart of a 3D object reconstruction method in another embodiment.

Optionally, as shown in FIG. 4, at S203, "the predicted semantic label is updated according to the confidence level of the predicted semantic label" may include:

at S301, determining whether the confidence level of a predicted semantic label is greater than a preset threshold value. If the confidence level of the predicted semantic label is greater than a preset threshold value, perform S302; otherwise, perform S303.

at S302, setting the predicted semantic label as a high-confidence-level label, predicting scanning images in the scanning image sequence by adopting the neural network algorithm according to the high-confidence-level label and the corresponding scanning image, and acquiring the updated predicted semantic labels.

Specifically, based on the S202 above, the confidence level of the predicted semantic label is acquired, and then the predicted semantic label is set as a high-confidence-level label if the confidence level of the predicted semantic label is greater than a preset threshold value. After the high-confidence-level labels are determined, machine learning is performed on the high-confidence-level labels and corresponding scanning images by adopting a neural network algorithm, such as an algorithm of self-learning, to acquire the updated predicted semantic labels.

at S303, setting the predicted semantic label as a low-confidence-level label, and re-annotating the scanning image corresponded to the low-confidence-level label by adopting active learning method, and acquiring the updated predicted semantic labels.

Continuously, based on the S202 above, the confidence level of the predicted semantic label is acquired, and then the predicted semantic label is set as a low-confidence-level label if the confidence level of the predicted semantic label is not greater than a preset threshold value; After the low-confidence-level labels are determined, the scanning image corresponded to the low-confidence-level label are re-annotated by adopting active learning method, and the updated predicted semantic labels are acquired.

With the 3D reconstruction method above, a terminal sets the predicted semantic label, the confidence level of which is greater than a preset threshold value, as a high-confidence-level label. And the terminal predicts scanning images in the scanning image sequence by adopting the neural network algorithm according to the high-confidence-level label and the corresponding scanning image, and acquires the updated predicted semantic labels. The terminal sets the predicted semantic label as a low-confidence-level label, and re-annotates the scanning image corresponded to the low-confidence-level label by adopting active learning method, and acquires the updated predicted semantic labels. In the present embodiment, a terminal updates the predicted semantic label according to the confidence level of the predicted semantic label. Thereby the terminal reconstructs a 3D model of the target object with higher accuracy according to the predicted semantic labels with a higher confidence level and the scanning images.

It should be noted that, a terminal predicts scanning images in the scanning image sequence by adopting the method of neural network training according to the high-confidence-level label and the corresponding scanning image, and acquires the updated predicted semantic labels. It may also re-annotate the scanning image corresponded to the low-confidence-level label by adopting active learning method, and acquires the updated predicted semantic labels. Or it may also update the predicted semantic labels by adopting both methods above. The present disclosure does not limit this.

Figure 4A:
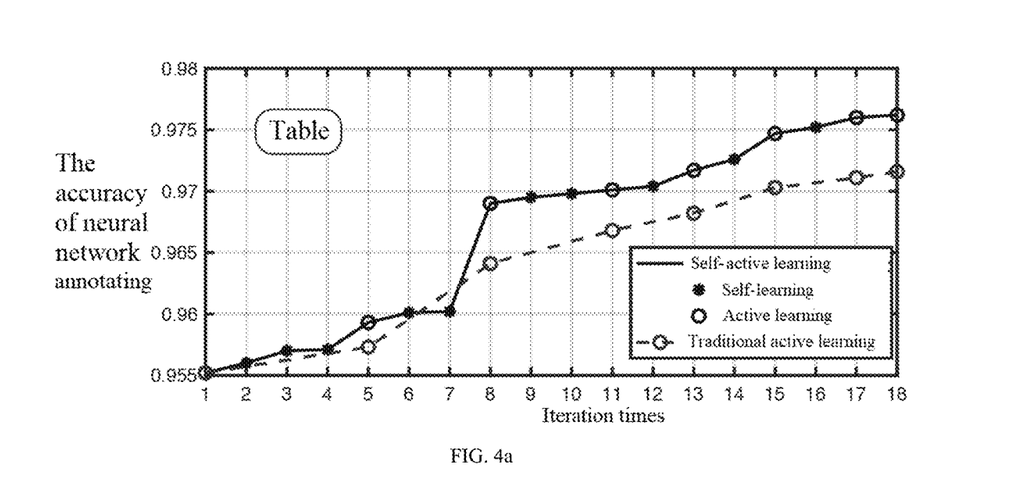
FIG. 4a is a comparison diagram of the accuracy of the 3D object reconstruction in an embodiment.
Figure 4B:
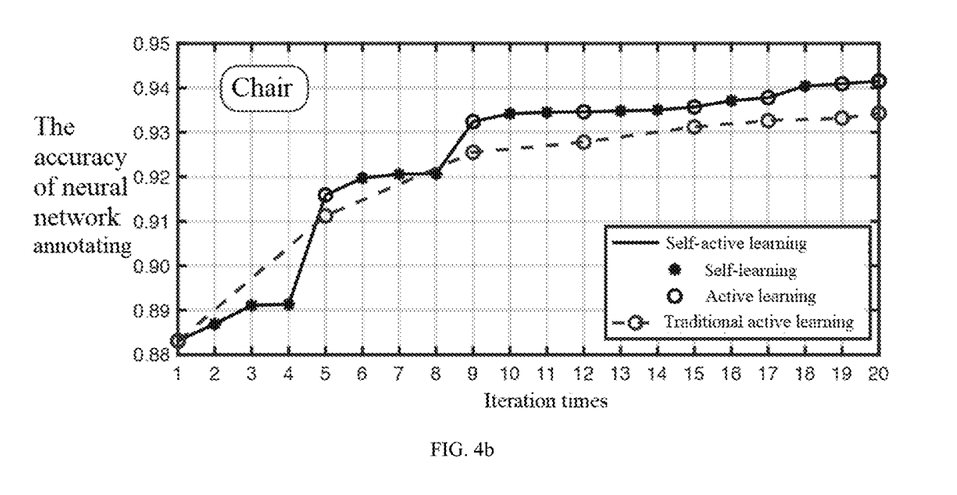
FIG. 4b is a comparison diagram of the accuracy of the 3D object reconstruction in another embodiment.
Figure 4C:
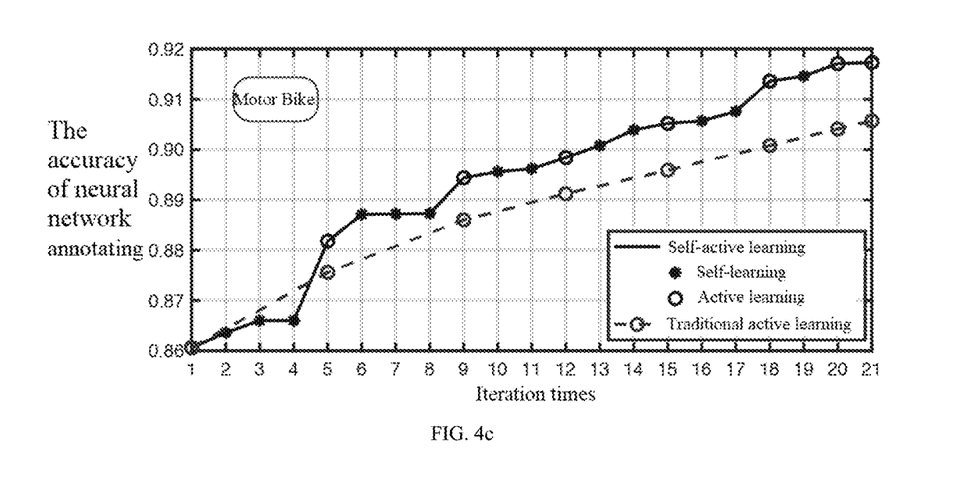
FIG. 4c is a comparison diagram of the accuracy of the 3D object reconstruction in another embodiment.

After updating the predicted semantic labels according to the confidence level of the predicted semantic labels, more accurate predicted semantic labels are obtained. As shown in FIG. 4a, FIG. 4b and FIG. 4c, updated predicted semantic labels are acquired by performing self-learning on high-confidence-level labels and performing active learning on low-confidence-level labels. Therefore, the predicted semantic labels that are acquired by so from the target object, such as a table, a chair or a motor bike, are obviously more accurate than that of being acquired by the method of traditional active learning.

Figure 5:
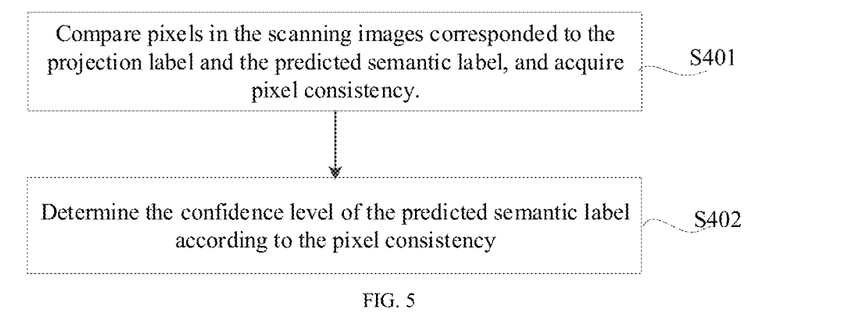
FIG. 5 is a schematic flow chart of a 3D object reconstruction method in another embodiment.

The specific process of acquiring the confidence level of the predicted semantic label according to the projection label and the predicted semantic label is as shown in FIG. 5. FIG. 5 is a schematic flow chart of a 3D object reconstruction method in another embodiment. The present embodiment relates to a specific process of a terminal acquiring the confidence level of the label according to the projection label and the predicted semantic label. As shown in FIG. 5, a method for implementing S202 includes:

at S401, comparing pixels in the scanning images corresponded to the projection label and the predicted semantic label, and acquiring pixel consistency.

Specifically, the pixel consistency may represent the similarity between images, which may be the percentage of all pixels in the images that are consistent. In the specific process of acquiring the pixel consistency, the percentage of pixels in the images that are consistent may be acquired as the pixel consistency by comparing pixels in the scanning images corresponded to the projection label and the predicted semantic label.

at S402, determining the confidence level of the predicted semantic label according to the pixel consistency.

Specifically, based on the above embodiments, after comparing pixels in the scanning images corresponded to the projection label and the predicted semantic label, and acquiring pixel consistency, the confidence level of the predicted semantic label is determined according to the pixel consistency. It may be determined as, set the label as a high-confidence-level label when the pixel consistency of the projection label and the predicted semantic label is greater than a preset consistency threshold. Otherwise, set the label as a low-confidence-level label.

With the 3D reconstruction method above, by comparing pixels in the scanning images corresponded to the projection label and the predicted semantic label, a terminal acquires pixel consistency, and determines the confidence level of the predicted semantic label. In the present embodiment, a terminal determines the confidence level of the predicted semantic label according to the consistency of the pixels in the scanning images corresponded to the projection label and the predicted semantic label, and then updates the predicted semantic label according to the confidence level of the predicted semantic label. Thereby the terminal reconstructs a 3D image of the target object with higher accuracy according to the predicted semantic labels with a higher confidence level and the scanning images.

The embodiments above illustrated the specific process of a terminal reconstructing a projection label of a 3D object, and then updating the predicted semantic label according to the confidence level of the projection label and the predicted semantic label, to acquire a more accurate 3D image. The specific process of the terminal acquiring the 3D image of the target object according to the predicted semantic label and the scanning images will be illustrated in detail below.

Optionally, at S103, "a 3D model of the target object is reconstructed according to the predicted semantic labels and the scanning images in the scanning image sequence" includes: mapping each scanning image to a corresponding position of a 3D preset model according to label distribution corresponded to each voxel of the 3D preset model and predicted semantic label, and obtaining the 3D image.

Specifically, the word voxel is the abbreviation of Volume Pixel. A 3D object which contains voxels, may be represented by stereo rendering or by extracting polygon iso-surfaces of a given threshold contour. A voxel may be the smallest unit of digital data segmentation in three dimensions. The 3D preset model may be represented according to a Truncation Sign Distance Function (TSDF). It may include multiple voxels. The label corresponding to each voxel may be used to represent the coordinate position of the voxel. A scanning image corresponding to the predicted semantic label with the same coordinate position is mapped at the position of the voxel to reconstruct the 3D object.

Figure 6:
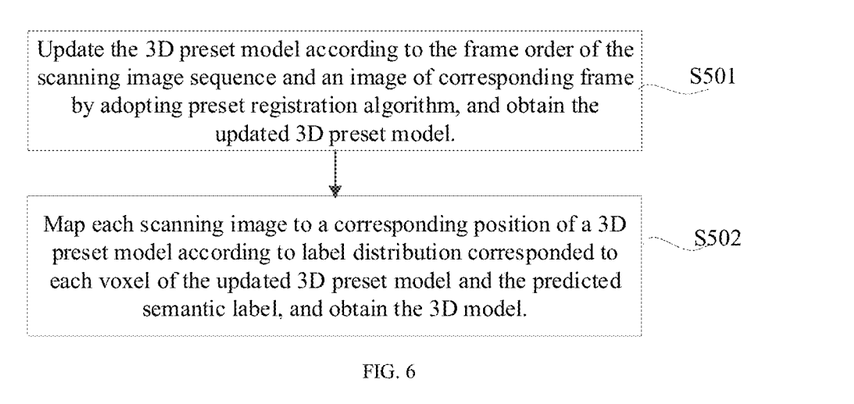
FIG. 6 is a schematic flow chart of a 3D object reconstruction method in another embodiment.

Further, it is possible to update a 3D preset model to acquire a new 3D preset model, and then a 3D model is obtained according to the updated 3D preset model. Optionally, as shown in FIG. 6, a possible implementation method of "mapping each scanning image to a corresponding position of a 3D preset model according to label distribution corresponded to each voxel of the 3D preset model and predicted semantic label, and obtaining the 3D model" includes:

at S501, updating the 3D preset model according to the frame order of the scanning image sequence and an image of corresponding frame by adopting preset registration algorithm, and obtaining the updated 3D preset model.

Specifically, the images of multiple frames in the scanning image sequence may be scanning images acquired by the scanning apparatus continuously scanning the target object. The difference of the object information included in images of adjacent frames is small. The images of multiple frames in the scanning image sequence may be images of the same object taken from different angles. Thus, after the image of the previous frame is mapped to the 3D preset model, the image of the next frame is used to register the image of the previous frame to acquire a more accurate object component, and to acquire a more accurate 3D model.

Taking using TSDF to represent a 3D preset model as an example, starting with an empty voxel whose TSDF value is zero, the first frame is registered to the mesh by using an identity matrix. The intermediate iterative process includes registering the frame $F_t$ to the existing model $M_{t-1}$ adopting a sensor pose estimation registration method. The model is constructed by the frames $\{F_1, \ldots, F_{t-1}\}$ that are previously registered and fused. It should be noted that, in the present embodiment, this method is adopted considering the semantic label of the image of the frame, the pixel of $F_t$ and the voxel of $M_{t-1}$ carry with different semantic labels, by mapping the pixel and the voxel with the same semantic labels to each other, the transformation from $F_t$ to $M_{t-1}$ is obtained. The detail will be illustrated below.

Firstly, pixels in $F_t$ are grouped into semantic sets $S_i$, each possible part label is i. In each set, only the pixels with high confidence level are reserved. If the information entropy H(P) of label probability distribution "P" of pixel is smaller than the threshold value θ, then the pixel is defined as a pixel with high confidence level. The information entropy is normally calculated as following.

$$H(p) = -\sum_{i=1}^{K} P_i \log P_i$$

Wherein, $P_i$ represents the probability of the pixel carrying with the label i. Similarly, in the present disclosure, the voxels of $M_{t-1}$ are grouped into semantic collections $S_i'$, in which only the voxels with high confidence level are contained.

Secondly, the candidate transformation of the semantic set can be calculated, and the optimal transformation between $F_t$ and $M_{t-1}$ is acquired by optimizing all candidate transformations. Specifically, the method of Iterative Closest Point (ICP) may be used to align each set $S_i$ in $F_t$ to the corresponding set $S_i'$ in $M_{t-1}$. ICP provides a rigid transformation $T_i$ for aligning two sets.

Giving a transformation set $\{T_i\}$ of all component labels, the target is to find a global transformation T, which combines all the transformations in $\{T_i\}$ at the best. Since the component labels are acquired by a network prediction, and different components may have different geometric properties, the transformation of different semantic sets corresponded should have different importance in optimization. A weight $w_i$ is defined for each set $S_i$ according to the target: $w_i = conf_i + size_i + var_i$ Wherein $conf_i$ is the average confidence in the prediction of the label of $S_i$ given by the average of H(P) of all pixels in $S_i$; $size_i$ represents the percentage of pixels of label $S_i$ distributed in $F_t$, and $var_i$ represents the variation of normal vector of voxels in the set $S_i'$ corresponding to the set $S_i$ in the reconstructed model. Therefore, weights reflect sets that are of higher confidence levels, larger sizes and more variation in the normals should affect the global transformation more. The reason for preferring high normal variation is that pixels with small normal variations tend to cause uncertainty in matching. For example, pixel matching on flat desktops is ambiguous because adding one translation before any one of such pixels being mapped results in the same loss value.

By solving the following optimization problem, the global transformation T* may be calculated by using weights defined by each set.

$$T^* = \underset{T}{\operatorname{argmin}} \sum_i \sum_j w_i \| T p_{i,j} - T_i p_{i,j} \|$$

Wherein, $p_{i,j}$ represents the j-th pixel of the set i. The objective states that the optimal transformation T* minimizes the weighted alignment distance for all the sets. The Gauss-Newton method may be used to optimize the objective function, and the objective function is linearized by using an iterative method, and the equation above is solved. Specifically, T* and $\{T_i\}$ are constrained to a rigid transformation which is only composed of translations and rotations. Then, in the present disclosure, $F_t$ is aligned $M_{t-1}$ to with T*, and the current frame is combined with the model, to generate a new model $M_t$.

After aligning, the label probability distribution for each voxel in $M_t$ is updated by accumulating the label distribution of the corresponding pixel in $F_t$ as following.

$$P_t^M = \frac{(t-1) \times P_{t-1}^M + P_t^F}{t}$$

Wherein, $P_t^M$ represents the label distribution of a voxel in the model at iteration t, and $P_t^F$ represents the label distribution of the corresponding pixel in the t-th frame.

at S502, mapping each scanning image to a corresponding position of a 3D preset model according to label distribution corresponded to each voxel of the updated 3D preset model and the predicted semantic label, and obtaining the 3D model.

Specifically, based on the S501 above, since the updated 3D preset model is acquired by mutual registration of images of multiple frames in the scanning image sequence, after acquiring the updated 3D preset model, in the updated 3D preset model, scanning images corresponding to predicted semantic labels of the same coordinate position are mapped to the position of the voxel, and a more accurate 3D model of the target object may be acquired.

With the 3D reconstruction method above, a terminal updates the 3D preset model according to the frame order of the scanning image sequence and an image of corresponding frame by adopting preset registration algorithm, and obtains updated 3D preset model. In addition, the terminal maps each scanning image to a corresponding position of a 3D preset model according to label distribution corresponded to each voxel of the updated 3D preset model and predicted semantic label, and obtains the 3D model. In the present embodiment, the terminal maps each scanning image to a corresponding position of a 3D preset model according to the correspondence of the label distribution corresponded to each voxel of the 3D preset model and predicted semantic label, and obtains the 3D model, making the reconstructed 3D object more accurate.

The 3D reconstruction method of the embodiment above only considered semantic components in the registration process. However, the background is also labeled and is stored in the volumetric representation of the reconstructed 3D model. The background is composed of data that is unrelated to the target object, such as a wall behind the target object. To implement reconstructing a more accurate 3D object, the terminal deletes the background, and only reserves the voxels of the target object. However, simply deleting the voxels with the greatest background confidence level may introduce some holes in the final 3D model due to the cumulative uncertainty of label predicting. The terminal acquires a more accurate 3D model by the method of deleting partial voxels to delete the background of the target object. The detail will be illustrated below with reference to FIG. 7.

Figure 7:
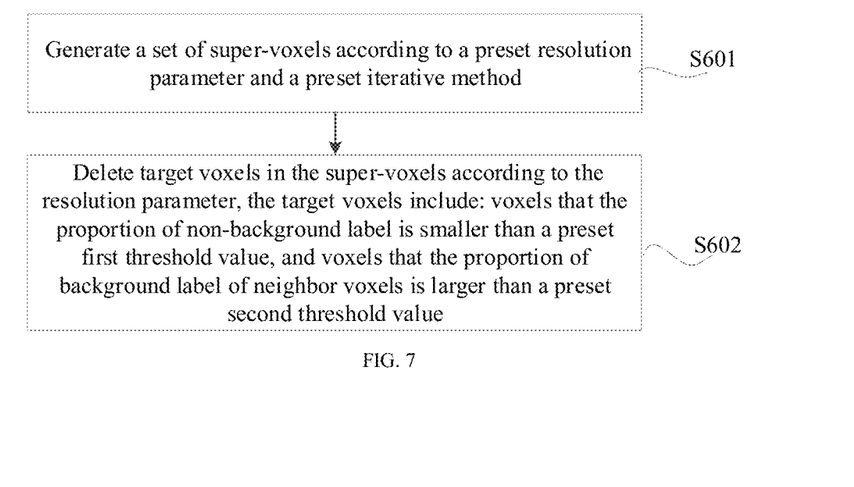
FIG. 7 is a schematic flow chart of a 3D object reconstruction method in another embodiment.
Figure 7A:
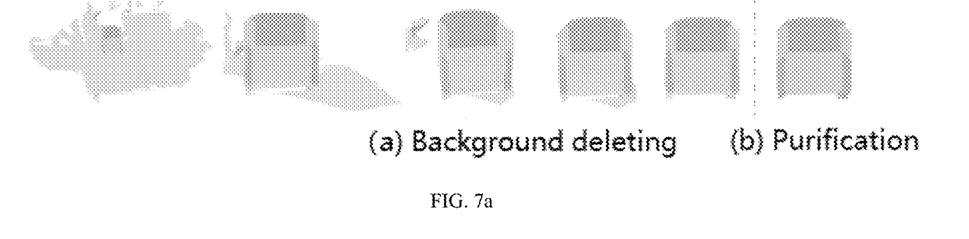
FIG. 7a is a schematic diagram of a 3D object reconstruction method in another embodiment.

FIG. 7 is a schematic flow chart of a 3D object reconstruction method in another embodiment. As shown in FIG. 7, the method further includes:

at S601, generating a set of super-voxels according to a preset resolution parameter and a preset iterative method.

Specifically, a super-voxel may be a volume pixel that is acquired according to a preset resolution parameter. It may variate according to the variation of the resolution. The higher the resolution is, the smaller the volume of the super-voxel is. The lower the resolution is, the bigger the volume of the super-voxel is. The preset resolution parameter may be altered according to a preset iterative method. The preset iterative method may be setting a low-resolution value, and altering the resolution value according to the step of the preset resolution parameter, and acquiring a new resolution parameter.

at S602, deleting target voxels in the super-voxels according to the resolution parameter, the target voxels include: voxels that the proportion of non-background label is smaller than a preset first threshold value, and voxels that the proportion of background label of neighbor voxels is larger than a preset second threshold value.

Specifically, it is possible that a low-resolution value is preset first, and a first set of super-voxels is generated. In addition, voxels that the proportion of non-background label is smaller than a preset first threshold value, and voxels that the proportion of background label of neighbor voxels is larger than a preset second threshold value, are deleted. The first threshold value and the second threshold value may be preset fixed values. They may also be values acquired according to machine learning. The embodiment of the present disclosure does not limit this. For example, the target voxels that the proportion of non-background labels is smaller than 5%, and the target voxels that less than half of all super-voxels adjacent to the target voxel are dominated by component labels, may be deleted. The above process is iteratively repeated. In each iterative process, the resolution parameter is increased to split the result from previous iterations into smaller super-voxels. The iterative process ends when the average confidence level of each super-voxel is greater than a given threshold value or when the maximum number of iterations is reached. FIG. 7 shows the 3D image acquired after deleting the target voxels in an embodiment. At the final phase of background removal, the model is divided into very fine-grained super-voxels, each of which is associated with the average label distribution of the voxels contained within it. The present disclosure uses a graph cut method to smooth super-voxel annotations based on these distributions. Specifically, it is possible to define an image, wherein each super-voxel is a node connected to its adjacent super-voxel, and the data item used to annotate the node is the label distribution based on the corresponding super-voxel, The smoothing term follows the Potts model by converting the probability value to an energy cost.

With the 3D reconstruction method above, the terminal generates a set of super-voxels according to a preset resolution parameter and a preset iterative method, and deletes target voxels in the super-voxels. The target voxels include: voxels that the proportion of non-background label is smaller than a preset first threshold value, and voxels that the proportion of background label of neighbor voxels is larger than a preset second threshold value. In the present embodiment, by deleting the target voxels in super-voxels, the terminal deletes the background image in the 3D model of the target object, so that the acquired 3D model of the target object is more accurate.

Figure 8:
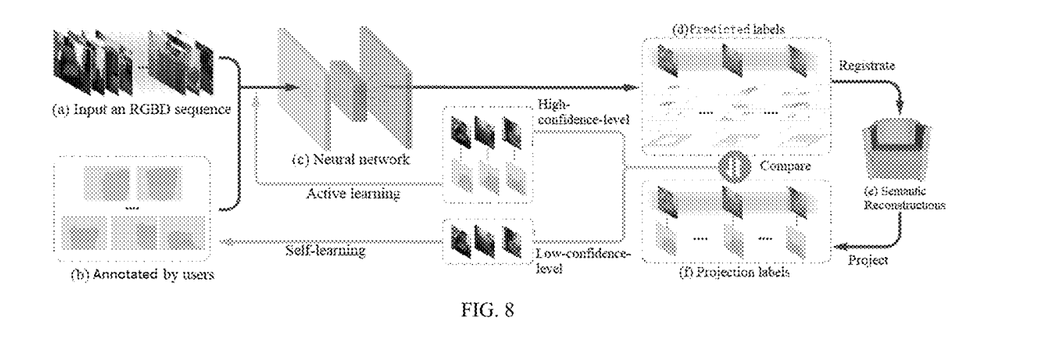
FIG. 8 is a schematic diagram of a 3D object reconstruction method provided by an embodiment.

Based on the above embodiment, as shown in FIG. 8, the terminal acquires a scanning image sequence, the scanning images in the scanning sequence may be RGBD images. The terminal adopts a neural network algorithm to acquire the predicted semantic labels of the scanning images, and then the terminal reconstructs a 3D model of the target object according to the predicted semantic labels and the scanning images. Further, it is possible to acquire a corresponding projection label according to the 3D model of the target object acquired, and then acquiring the confidence level between the projection label and the predicted semantic label, performing self-learning and active learning on the scanned images respectively according to the confidence level, to acquire a more accurate 3D model of the target object. It should be noted that FIG. 8 is only an example.

FIG. 8 is a schematic diagram of a 3D object reconstruction apparatus provided by an embodiment. As shown in FIG. 8, the 3D object reconstruction includes: an acquisition module 10, a prediction module 20, and a reconstruction module 30, wherein, the acquisition module is configured to acquire a scanning image sequence of a target object, wherein the scanning image sequence includes at least one frame of scanning image, and the scanning images include depth information;

the prediction module is configured to predict scanning images in the scanning image sequence by adopting a neural network algorithm, and to acquire a predicted semantic label of each scanning image; and the reconstruction module is configured to reconstruct a 3D model of the target object according to the predicted semantic labels and the scanning images in the scanning image sequence.

The 3D object reconstruction apparatus provided by the embodiment of the present disclosure can implement the method of the embodiment above. The implementation theory and technical effect are similar, and will not be described here.

The specific definition of a 3D object reconstruction apparatus can refer to the above definition of a 3D object reconstruction method, and will not be described here. Each of the above modules in the 3D object reconstruction apparatus may be implemented in whole or in part by software, hardware and combinations thereof. Each of the above modules may be embedded in or independent of the processor in the computer apparatus in hardware forms, or may be stored in the memory of the computer apparatus in software forms, so that the processor can invoke and execute the operations corresponding to the above each module.

Figure 9:
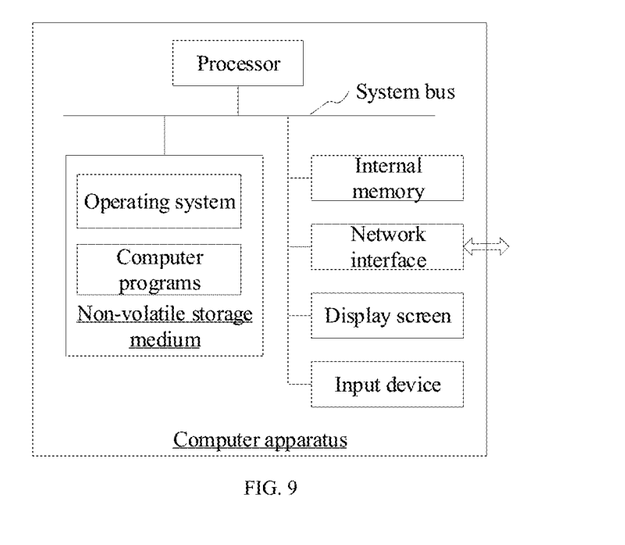
FIG. 9 is an internal structure diagram of the computer apparatus in an embodiment.

In an embodiment, a computer apparatus is provided, which may be a terminal, and its internal structure diagram may be as shown in FIG. 9 The computer apparatus includes a processor, a memory, a network interface, a display screen, and an input device connected by a system bus. The processor of the computer apparatus is configured to provide computing and control capabilities. The memory of the computer apparatus includes non-volatile storage medium and internal memory. The non-volatile storage medium is stored with an operating system and computer programs. The internal memory provides a running environment for the operating system and the computer programs in the non-volatile storage medium. The network interface of the computer apparatus is configured to communicate with external terminals via network connections. The computer apparatus is executed by the processor to implement a 3D object reconstruction method. The display screen of the computer apparatus may be a liquid crystal display or an electronic ink display, and the input device of the computer apparatus may be a touch layer covered on the display screen, or may be a button, a trackball or a touch pad provided on the housing of the computer apparatus, or may be an external keyboard, a touch pad or a mouse.

It will be understood by those skilled in the art that the structure shown in FIG. 9 is only a block diagram of a part of the structure related to the solution of the present disclosure, and does not constitute a limitation of the computer apparatus to which the solution of the present disclosure is applied. The specific computer apparatus may include more or fewer components than those shown in the figure or combinations of some components, or have different component arrangements.

In an embodiment, a computer apparatus including a memory and a processor is provided. The memory is stored with computer programs, and the following steps will be implemented when the processor executes the computer programs.

acquiring a scanning image sequence of a target object, wherein the scanning image sequence includes at least one frame of scanning image, and the scanning images include depth information;

predicting, by adopting a neural network algorithm, scanning images in the scanning image sequence, and acquiring a predicted semantic label of each scanning image; and reconstructing, according to the predicted semantic labels and the scanning images in the scanning image sequence, a 3D model of the target object.

The implementation theory and technical effect of the computer apparatus provided by the present embodiment are similar with the embodiments of the method above, and will not be described here.

In an embodiment, a computer-readable storage medium is provided. It is stored with the computer programs, and the following steps will be implemented when the computer programs are executed by the processor.

acquiring a scanning image sequence of a target object, wherein the scanning image sequence includes at least one frame of scanning image, and the scanning images include depth information;

predicting, by adopting a neural network algorithm, scanning images in the scanning image sequence, and acquiring a predicted semantic label of each scanning image; and reconstructing, according to the predicted semantic labels and the scanning images in the scanning image sequence, a 3D model of the target object.

The implementation theory and technical effect of the computer-readable storage medium provided by the present embodiment are similar with the embodiments of the method above, and will not be described here.

It will be understood by those skilled in the art that all or part of the flows in the methods of the above embodiments may be implemented by the computer programs to instruct related hardwares, and the computer programs can be stored in a non-volatile computer-readable storage medium, and the flows of the embodiments of the above methods can be implemented when the computer programs are executed. Any reference to the memory, the storage, the database or other media used in various embodiments provided in the present disclosure may include non-volatile and/or volatile memory. A non-volatile memory may include a read only memory (ROM), programmable ROM (PROM), an electrically programmable ROM (EPROM), an electrically erasable programmable ROM (EEPROM) or a flash memory. A volatile memory may include a random-access memory (RAM) or an external cache memory. By way of illustration and not limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above-described embodiments may be combined arbitrarily. To simplify the description, not all the possible combinations of the technical features in the above embodiments are described. However, all the combinations of these technical features should be considered as within the scope of the present disclosure, if such combinations do not contradict with each other.

The above embodiments only represent several embodiments of the present disclosure, and the description thereof is more specific and detailed, but it should not be constructed as limiting the scope of the present disclosure. It should be noted that, for those skilled in the art, several variations and improvements may be made without departing from the concept of the present disclosure, and these are all within the protection scope of the present disclosure. Therefore, the scope of the present disclosure shall be defined by the appended claims.

The invention claimed is:

1. A 3D reconstruction method, comprising:
    acquiring a scanning image sequence of a target object, the scanning image sequence including at least one scanning image, the at least one scanning image comprising at least one frame, and the at least one scanning image including depth information;
    performing, by using a neural network algorithm, a prediction based on the at least one scanning image in the scanning image sequence, and acquiring a predicted semantic label of each scanning image of the at least one scanning image, thereby acquiring at least one predicted semantic label; and
    reconstructing, according to the at least one predicted semantic label and the at least one scanning image in the scanning image sequence, a 3D model of the target object;
    wherein reconstructing a 3D model of the target object according to the at least one predicted semantic label and the at least one scanning image in the scanning image sequence comprises:
    mapping, according to label distribution corresponding to each voxel of a 3D preset model and each label of the at least one predicted semantic label, each scanning image of the at least one scanning image to a corresponding position of the 3D preset model, to obtain the 3D model of the target object.

2. The method of claim 1, further comprising, after reconstructing the 3D model of the target object according to the at least one predicted semantic label and the at least one scanning image in the scanning image sequence:
    for each scanning image in the scanning image sequence:
        acquiring, according to the 3D model, a projection label of the scanning image in the scanning image sequence;
        acquiring, according to the projection label of the scanning image and the predicted semantic label of the scanning image, a confidence level of the predicted semantic label of the scanning image; and
        updating the predicted semantic label of the scanning image according to the confidence level of the predicted semantic label of the scanning image.

3. The method of claim 2, wherein updating the predicted semantic label of the scanning image according to the confidence level of the predicted semantic label of the scanning image comprises:
    setting the predicted semantic label as a high-confidence-level label when the confidence level of the predicted semantic label is greater than a preset threshold value; and
    performing, according to the high-confidence-level label and the corresponding scanning image in the scanning image sequence, a prediction by using the neural network algorithm, and acquiring at least one updated predicted semantic label.

4. The method of claim 2, wherein updating the predicted semantic label of the scanning image according to the confidence level of the predicted semantic label of the scanning image further comprises:
    setting the predicted semantic label as a low-confidence-level label; when the confidence level of the predicted semantic label is not greater than a preset threshold value; and
    re-annotating the scanning image corresponding to the low-confidence-level label by using an active learning method, and acquiring at least one updated predicted semantic label.

5. The method of claim 2, wherein acquiring the confidence level of the predicted semantic label of the scanning image, according to the projection label of the scanning image and the predicted semantic label of the scanning image, comprises:
    comparing pixels in the scanning image corresponding to the projection label and the predicted semantic label, and acquiring pixel consistency; and
    acquiring the confidence level of the predicted semantic label according to the pixel consistency.

6. The method of claim 1, wherein the at least one scanning image comprises a plurality of scanning images, wherein the at least one frame comprises a plurality of frames, and wherein mapping each scanning image of the at least one scanning image to the corresponding position of the 3D preset model, according to label distribution corresponding to each voxel of the 3D preset model and each label of the at least one predicted semantic label comprises:
updating, according to each scanning image of the scanning image sequence and a frame order of each scanning image of the scanning image sequence, the 3D preset model by using a preset registration algorithm, and obtaining an updated 3D preset model; and
mapping, according to label distribution corresponding to each voxel of the updated 3D preset model and each label of the at least one predicted semantic label, each scanning image of the scanning image sequence to a corresponding position of the updated 3D preset model.

7. The method of claim 1, further comprising, after reconstructing the 3D model of the target object according to the at least one predicted semantic label and the at least one scanning image in the scanning image sequence:
generating, according to a preset resolution parameter and a preset iterative method, a first set of super-voxels; and
deleting, according to the resolution parameter, target voxels in the first set of super-voxels, the target voxels including voxels in which the proportion of non-background labels is smaller than a preset first threshold value, and voxels in which the proportion of background labels of neighboring voxels is larger than a preset second threshold value.

8. A computer apparatus comprising a memory and a processor, the memory storing computer programs, wherein, the computer programs are configured so that the steps of the method of claim 1 are implemented when the processor executes the computer programs.

9. A computer-readable storage medium in which computer programs are stored, wherein, the computer programs are configured so that the steps of the method of claim 1 are implemented when the processor executes the computer programs.

10. A 3D reconstruction method, comprising:
acquiring a scanning image sequence of a target object, the scanning image sequence including at least one scanning image, the at least one scanning image comprising at least one frame, and the at least one scanning image including depth information;
performing, by using a neural network algorithm, a prediction based on the at least one scanning image in the scanning image sequence, and acquiring a predicted semantic label of each scanning image of the at least one scanning image, thereby acquiring at least one predicted semantic label;
reconstructing, according to the at least one predicted semantic label and the at least one scanning image in the scanning image sequence, a 3D model of the target object; and
for each scanning image in the scanning image sequence:
acquiring, according to the 3D model, a projection label of the scanning image in the scanning image sequence;
acquiring, according to the projection label of the scanning image and the predicted semantic label of the scanning image, a confidence level of the predicted semantic label of the scanning image; and
updating the predicted semantic label of the scanning image according to the confidence level of the predicted semantic label of the scanning image.

11. A 3D reconstruction method, comprising:
acquiring a scanning image sequence of a target object, the scanning image sequence including at least one scanning image, the at least one scanning image comprising at least one frame, and the at least one scanning image including depth information;
performing, by using a neural network algorithm, a prediction based on the at least one scanning image in the scanning image sequence, and acquiring a predicted semantic label of each scanning image of the at least one scanning image, thereby acquiring at least one predicted semantic label;
reconstructing, according to the at least one predicted semantic label and the at least one scanning image in the scanning image sequence, a 3D model of the target object; and
generating, according to a preset resolution parameter and a preset iterative method, a first set of super-voxels; and
deleting, according to the resolution parameter, target voxels in the first set of super-voxels, the target voxels including voxels in which the proportion of non-background labels is smaller than a preset first threshold value, and voxels in which the proportion of background labels of neighboring voxels is larger than a preset second threshold value.

* * * * *